Figure 1:
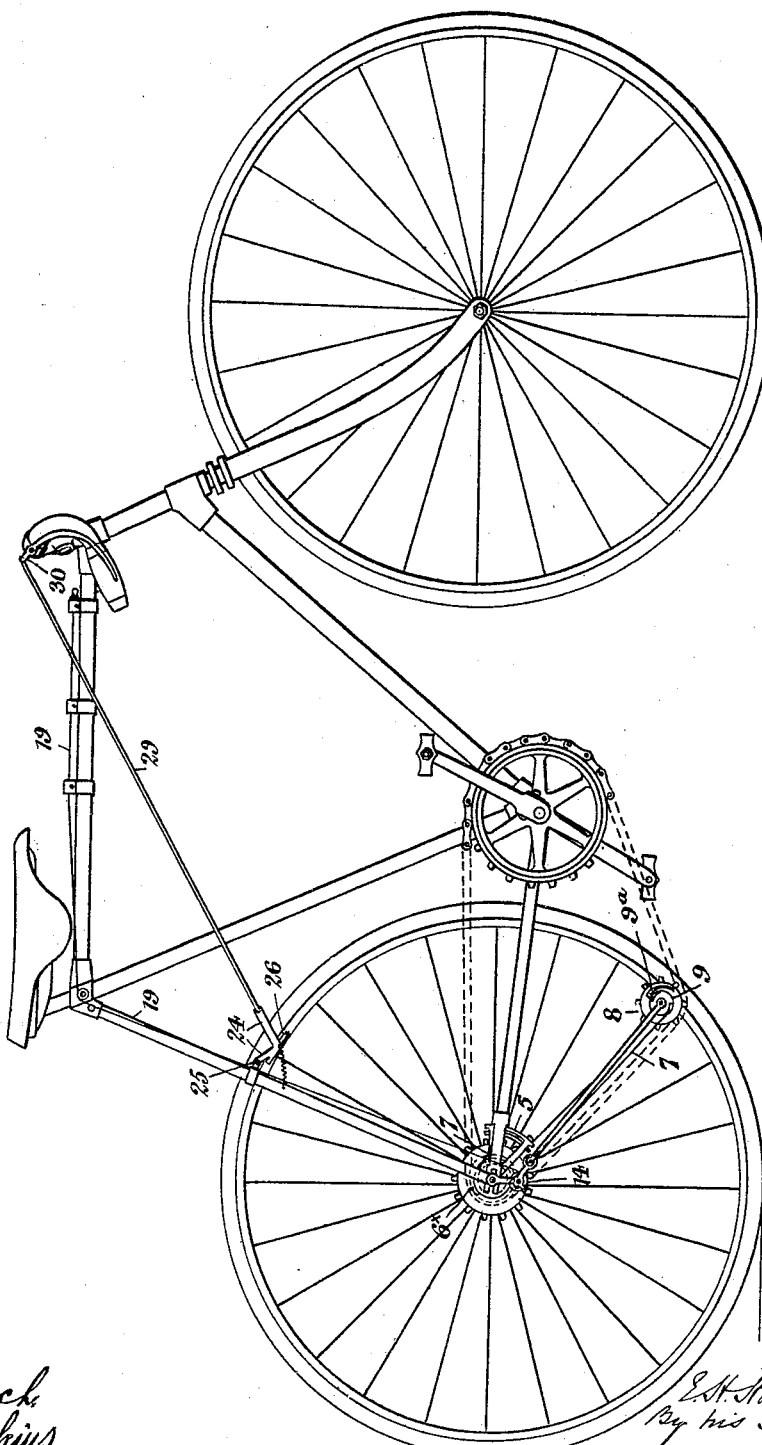

No. 619,572. Patented Feb. 14, 1899.
E. H. HODGKINSON.
CHANGEABLE GEAR FOR VEHICLES.
(Application filed Feb. 7, 1898.)

(No Model.) 6 Sheets—Sheet 1.

Witnesses
E. A. Balloch,
A. M. Parkins.

Inventor
E. H. Hodgkinson
By his Attorneys
Baldwin Davidson & Wight.

No. 619,572. Patented Feb. 14, 1899.
E. H. HODGKINSON.
CHANGEABLE GEAR FOR VEHICLES.
(Application filed Feb. 7, 1898.)
(No Model.) 6 Sheets—Sheet 3.

No. 619,572. Patented Feb. 14, 1899.
E. H. HODGKINSON.
CHANGEABLE GEAR FOR VEHICLES.
(Application filed Feb. 7, 1898.)

(No Model.) 6 Sheets—Sheet 4.

Witnesses.
E. A. Bauroch.
A. M. Parkins.

Inventor.
E. H. Hodgkinson,
By his Attorneys,
Baldwin Davidson + Wight.

No. 619,572. Patented Feb. 14, 1899.
E. H. HODGKINSON.
CHANGEABLE GEAR FOR VEHICLES.
(Application filed Feb. 7, 1898.)

(No Model.) 6 Sheets—Sheet 5.

Witnesses.
E. A. Balloch.
A. H. Parkins.

Inventor.
E. H. Hodgkinson
By his Attorneys
Baldwin Davidson & Wight

THE NORRIS PETERS CO., PHOTO-LITHO., WASHINGTON, D. C.

No. 619,572. Patented Feb. 14, 1899.
E. H. HODGKINSON.
CHANGEABLE GEAR FOR VEHICLES.
(Application filed Feb. 7, 1898.)
(No Model.) 6 Sheets—Sheet 6.

Witnesses.
Inventor.

UNITED STATES PATENT OFFICE.

EDMUND HUGH HODGKINSON, OF LONDON, ENGLAND.

CHANGEABLE GEAR FOR VEHICLES.

SPECIFICATION forming part of Letters Patent No. 619,572, dated February 14, 1899.

Application filed February 7, 1898. Serial No. 669,429. (No model.)

*To all whom it may concern:*

Be it known that I, EDMUND HUGH HODGKINSON, gentleman, a subject of the Queen of Great Britain, residing at 8 Lancaster Gate, London, in the county of Middlesex, England, have invented certain new and useful Changeable Gear for Vehicles, of which the following is a specification.

This invention applies more especially to change-speed driving-gear velocipedes described in my application for a patent in the United States of America, Serial No. 660,130; but portions of it are applicable to ordinary velocipedes and to automotor-carriages. The driving-chain is shifted from one pulley to another by the aid of a chain-lifter such as is described in my former specification. Such chain-lifter has, however, two or more limbs and is placed inside the machine. Each limb of the chain-lifter makes a partial rotation around the stationary axle of the rear driving-wheel. The leading limb is connected by a cord or wire with a jockey-roller, which is provided to take up the slack of the driving-chain. The jockey-roller runs freely in a forward direction, but by means of a suitable catch may on a reverse movement be made to wind up the cord and raise the leading limb of the chain-lifter. When the leading limb has been raised a suitable distance, it comes in contact with a stop and by this means raises the other limb as far as is needed. In this position the leading limb keeps the chain clear of the lower half of the pinion and the other limb keeps the chain clear of the other half of the pinion. On again pedaling forward the two limbs are carried out of use and fold one over the other clear of the chain.

The machine is provided with a brake which acts on the rim of the back wheel and is actuated by a rod passing directly to the handle-bar.

Figure 2:
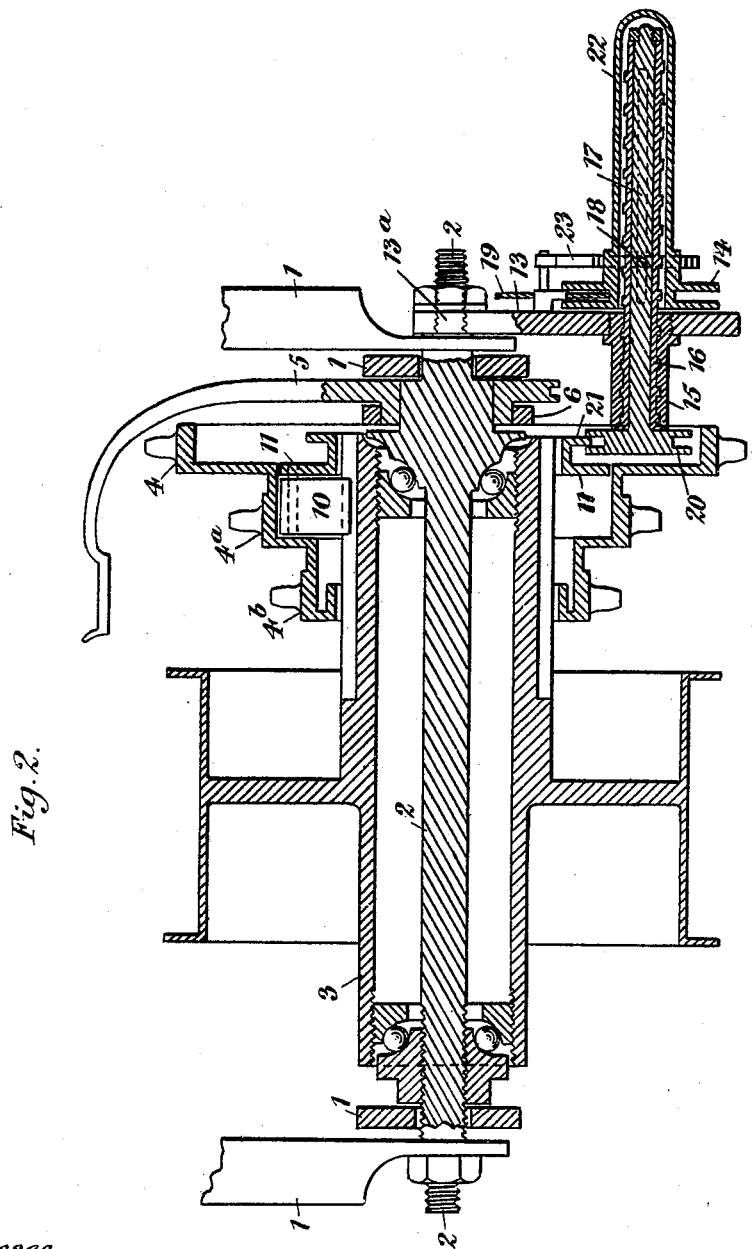
Figure 3:
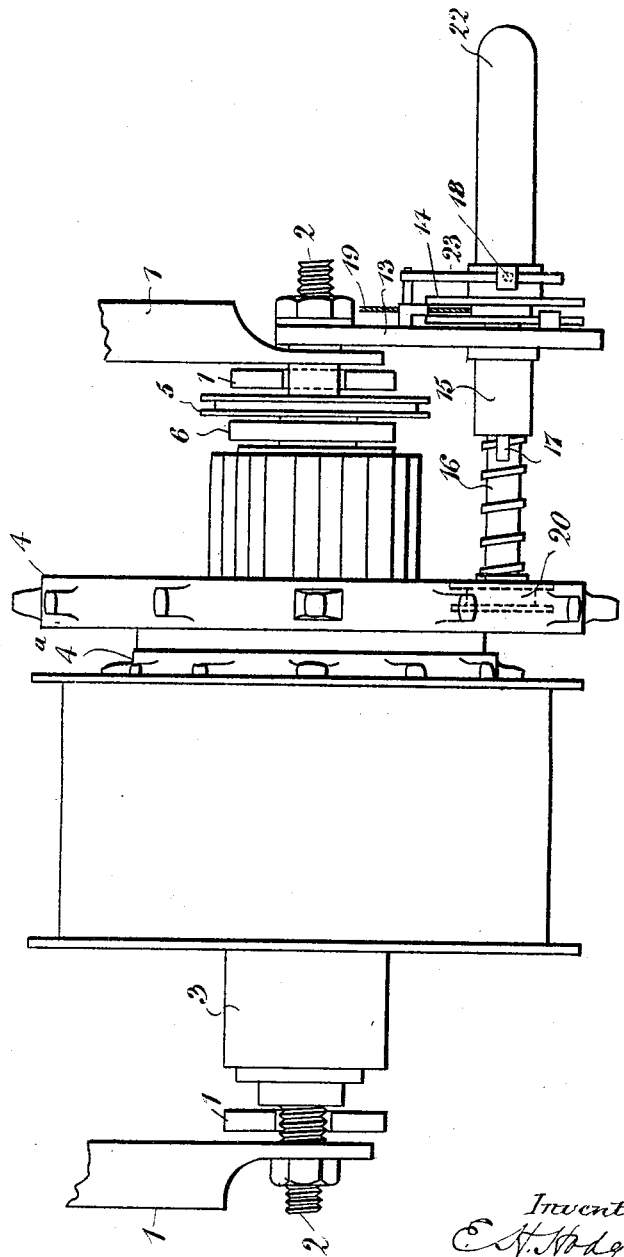
Figure 4:
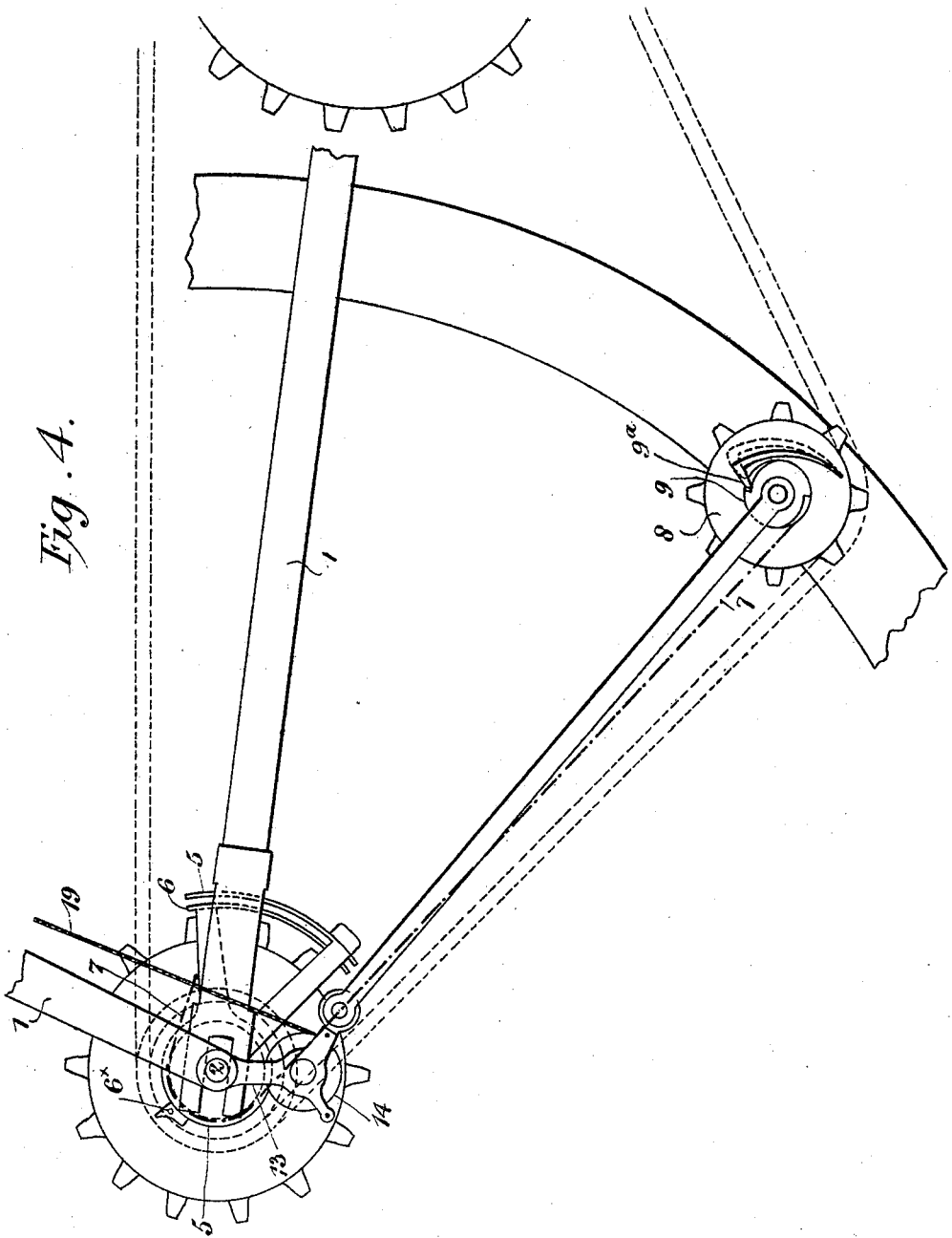
Figure 5:
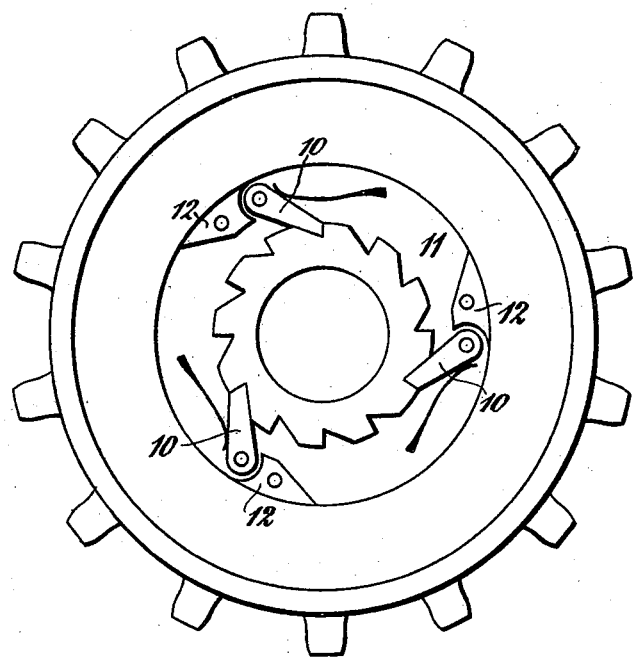
Figure 6:
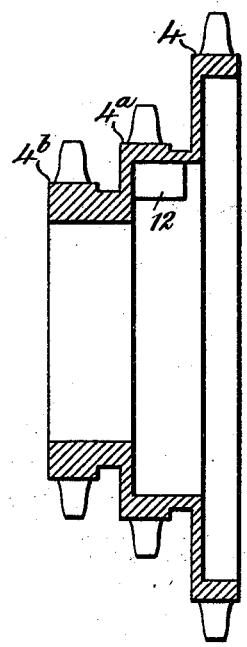
Figure 7:
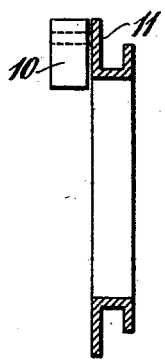
Figure 8:
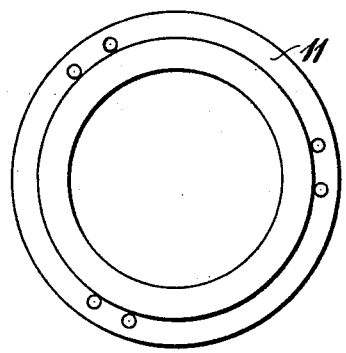
Figure 9:
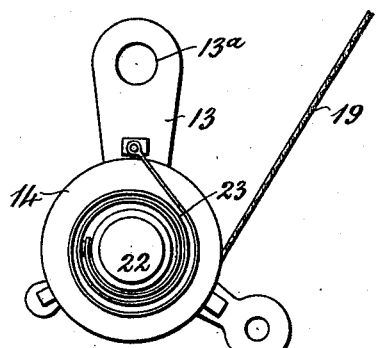
Figure 11:
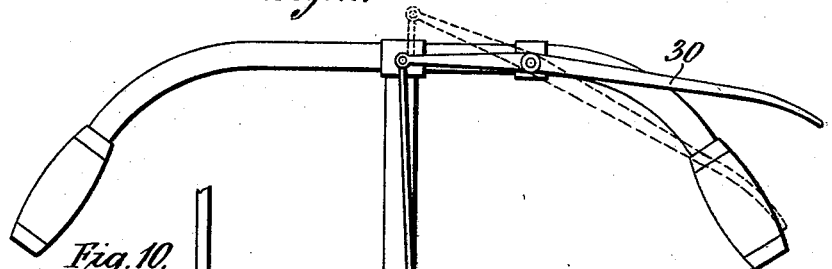
Figure 10:
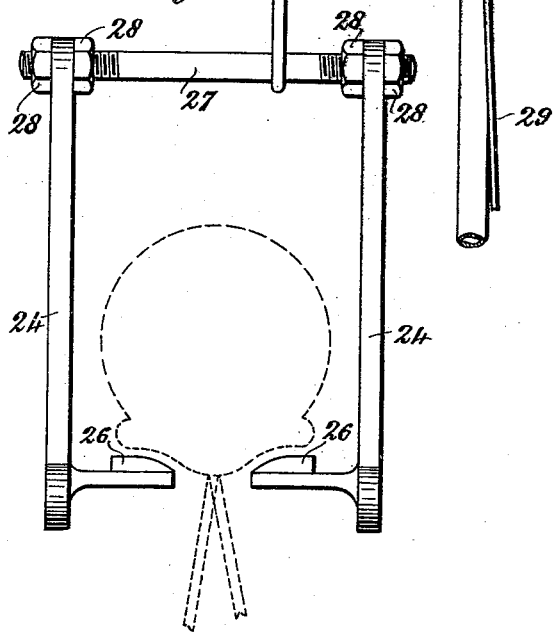

Figure 1 is a side elevation of a bicycle to which my invention is applied, the driving-chain being on the smallest pinion. Fig. 2 is a section through the boss of the hind wheel. Fig. 3 is an elevation of the boss. Fig. 4 is a view, to a larger scale, of the chain-lifter and jockey-wheel. Fig. 5 is a front elevation of the pinion-block and the pawls which it carries. Fig. 6 shows a section of the pinion-block. Fig. 7 shows a ring on which the pawls are carried. Fig. 8 shows an elevation of this ring. Fig. 9 shows the reel on which the cord which actuates the screw for shifting the pinions is wound by means of a spring. Fig. 10 is a plan of the brake. Fig. 11 is a plan of the handle-bars, showing the brake-lever.

In Fig. 2, 1 is a portion of the frame. 2 is the stationary wheel-spindle, which the frame carries. 3 is the boss of the wheel. It can revolve about the spindle on ball-bearings. $4, 4^a$, and $4^b$ are three driving-pinions of different sizes, either of which can be employed. They collectively form a pinion-block and can be slid along the boss, with which also they engage by means of pawls. When back-pedaling, the pawls allow the pinions to revolve independently of the boss.

Fig. 4 shows the portions 5 and 6 of the divided chain-lifter. They are mounted upon the neck of the spindle so as to be able to turn thereon. In this figure they are seen in the position they occupy when out of operation. They then lie against a suitable stop upon the frame. 7 is a cord attached to and wrapped partially around the leading part 5. When this cord is pulled, as hereinafter described, the part 5 is raised until it comes against the stop $6^\times$ upon the following limb 6. The two limbs then travel on together until they are brought to rest by a stop upon the frame, such as the nut 15. The chain being then entirely free of the driving-pinions, these pinions can then be shifted along the boss of the wheel by means hereinafter described. On again pedaling forward the parts of the chain-lifter return to their original position and the chain drops onto the driving-pinion, which has been brought into position to receive it.

In order to immediately raise the leading limb 5 on reversing the chain, I connect the lower portion of the arm carrying the limb with the jockey-roller 8, which is provided to to take up the slack of the driving-chain. The jockey-roller is supported by a rod $8^\times$, pivoted to the frame, and it has a reel or drum 9 connected with it by a ratchet-wheel and spring-pawl $9^a$. So long as the machine runs forward the drum does not turn; but as soon as back-pedaling commences the ratchet engages and the drum revolves with the jockey-wheel and winds up the cord 7 until it is resisted by the chain-lifter coming against its stop. The pawl is so constructed, as shown, that it can then yield and pass the teeth of the ratchet, and thus allow movement of the jockey-wheel on continued back-pedaling. A spring may be provided to return the chain-lifter to its position of rest when forward pedaling commences.

In order to allow the driving-pinions to turn freely on the hub of the wheel when back-pedaling, I employ spring-catches on the pinion-block, as before, which enter corresponding recesses in the hub of the wheel; but I now arrange the catches to project inward, and I place the recesses on the hollow spindle.

I preferably employ jam-catches or pawls, each of which, though pivoted to the pinion-block, is so incased in a suitable recess in the pinion-block that in driving it transmits the pressure direct from the pinion-block to the hollow spindle, so that the pin by which the catch or pawl is fastened to the block does not bear the strain. The arrangement of the catches is illustrated by Figs. 2, 5, 6, 7, and 8. The pawls 10 are loosely pivoted to the ring 11, and the ring is firmly fixed by screws to the pinion-block.

12 are buttresses upon the pinion-block, to which the outer ends of the pawls are fitted, and the driving power is transmitted from the buttress through the pawl to the boss of the wheel without any strains coming upon the joint-pins.

For moving the pinions laterally along the spindle I now employ a screw held in a little frame carried upon an arm which can be fastened onto the inner solid spindle by the usual outside nut. The screw is turned by means of a reel or drum upon it and moves parallel to the spindle. The reel turns the screw by an inner projecting pin which enters a slot at right angles to the screw. The screw can thus be made to advance and retire through the reel itself and the frame holding it. This screw at its inner end carries a loose wheel having an annular groove which engages with a flange on the pinion-block. Thus when the reel is turned the screw imparts lateral motion to the pinion-block. The reel is actuated by a cord or wire wound upon it, the other end of which is placed in any suitable position for the hand of the rider. The reverse motion of the reel is obtained by a spring having a tendency to wind up the cord. This appliance is seen in Figs. 2 and 3. In Fig. 2 the pinion-block is at its extreme right-hand position, and in Fig. 3 it has been moved toward the left. 13 is a plate fixed on the end of the stationary spindle of the rear wheel, which passes through it at 13ª.

14 is a reel (shown separately in Fig. 9) mounted on this plate, to which it is held by clips. On the other side of the plate a screw-nut 15 is fixed, and the screw 16 works through this nut. The screw has a slot 17 in it, and the end of a pin 18, which is fast with the reel 14, enters the slot. Hence when the reel is turned, as by pulling the cord 19, wound upon it, the screw also turns and it advances through the nut. The screw at its end carries the roller 20, which engages with a flange 21 on the ring 11, which is fixed to the pinion-block. The casing 22, which receives the screw within it, revolves with the reel. The screw as it moves longitudinally carries the pinion-block along the boss of the wheel. The cord 19 is carried up to the front of the machine in guides, as can be seen in Fig. 1. The cord is wound upon the reel by the coiled spring 23, Fig. 9.

I employ a rear-wheel rim-brake actuated by a rod passing direct to the center of the handle-bar and worked by a hand-lever in the usual way. The brake, as can be seen in Figs. 1 and 10, consists of two L-shaped side pieces 24, pivoted at 25 to the frame of the machine and carrying brake-pads 26. The other ends of the side pieces are connected together by a stirrup-piece 27. This piece is secured by screw-nuts 28, so that the brake can be adjusted to wheels of different widths. A direct-acting rod 29 connects the brake to the handle 30, pivoted to the handle-bar, as can be seen in Figs. 1 and 11. This mode of operating brakes can be applied to any sort of brake.

What I claim is—

1. The combination of a driving-wheel, means for operating it, a wheel to be driven, chain-pinions of different sizes connected with the wheel to be driven, a chain connecting the driving-wheel with the pinions, a chain-lifter formed in two parts, means whereby one part after moving independently actuates the other part, means for actuating the first part, and means for shifting the pinions.

2. The combination of a driving-wheel, means for operating it, a wheel to be driven, chain-pinions of different sizes connected with the wheel to be driven, a chain connecting the driving-wheel with the pinions, a chain-lifter formed in two parts, means for shifting one part of the chain-lifter, and a stop operated by such part for moving the second part of the chain-lifter, after the first part has moved for a time independently.

3. The combination of a driving-wheel, means for operating it, a wheel to be driven, chain-pinions of different sizes connected with the wheel to be driven, a chain connecting the driving-wheel with the pinions, a chain-lifter formed in two parts, mounted inside the frame of the machine, means for actuating the first part of the chain-lifter to cause it after moving for a time independently, to actuate the other part, and means for shifting the pinions.

4. The combination of a driving-wheel, means for operating it, a wheel to be driven, chain-pinions of different sizes connected with the wheel to be driven, a driving-chain connecting the driving-wheel with the pinions, a chain-lifter, a jockey-wheel actuated by the driving-chain, a drum on the jockey-wheel, means for actuating the drum, and means for connecting the chain-lifter with the drum.

5. The combination of a driving-wheel, means for operating it, a wheel to be driven, chain-pinions of different sizes connected with the wheel to be driven, a chain connecting the driving-wheel with the pinions, a chain-lifter, a jockey-wheel actuated by the driving-chain, a drum on the jockey-wheel, a spring-pawl on the jockey-wheel engaging with the drum, and means for connecting the chain-lifter with the drum.

6. The combination of a driving-wheel, means for operating it, a wheel to be driven, chain-pinions of different sizes connected with the wheel to be driven, a chain connecting the driving-wheel with the pinions, means for shifting the chain on the pinions, a pinion-ring, pawls on the pinion-ring, and recesses on the wheel-hub with which said pawls engage.

7. The combination of a driving-wheel, means for operating it, a wheel to be driven, chain-pinions of different sizes connected with the wheel to be driven, a chain connecting the driving-wheel with the pinions, a pinion-ring, a screw engaging with the pinion-ring and which is provided with a slot, a pin entering the slot, a reel fixed to the pin, and means for actuating the reel.

EDMUND HUGH HODGKINSON.

Witnesses:
WALTER J. SKERTEN,
FREDK. C. WEATHERLY.